United States Patent
Ikada et al.

(10) Patent No.: US 7,368,093 B2
(45) Date of Patent: May 6, 2008

(54) PROCESS FOR PREPARING FUSED SOLID OF EUROPIUM HALIDE

(75) Inventors: Tomotake Ikada, Kanagawa (JP); Atsunori Takasu, Kanagawa (JP); Yasuo Iwabuchi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 552 days.

(21) Appl. No.: 10/833,309

(22) Filed: Apr. 28, 2004

(65) Prior Publication Data

US 2005/0002844 A1    Jan. 6, 2005

(30) Foreign Application Priority Data

Apr. 28, 2003    (JP) ............................. 2003-123542

(51) Int. Cl.
*C01F 17/00*    (2006.01)
*C01D 17/00*    (2006.01)

(52) U.S. Cl. ..................... 423/21.1; 423/263; 423/491; 252/301.4 H; 428/691

(58) Field of Classification Search ............... 423/21.1, 423/263, 491; 252/301.4 H; 250/483.1; 428/691

See application file for complete search history.

(56) References Cited

U.S. PATENT DOCUMENTS

| | | | | |
|---|---|---|---|---|
| 4,157,981 | A | * | 6/1979 | Stevels et al. ....... 252/301.4 H |
| 5,514,298 | A | * | 5/1996 | Terrell et al. ........ 252/301.4 H |
| 6,597,561 | B1 | * | 7/2003 | Devooght et al. ....... 361/306.1 |
| 2002/0032358 | A1 | * | 3/2002 | Atobe et al. ................ 588/206 |

* cited by examiner

*Primary Examiner*—Ngoc-Yen Nguyen
(74) *Attorney, Agent, or Firm*—Sughrue Mion, PLLC

(57) ABSTRACT

Fused solid of an europium halide containing a less amount of europium oxyhalide impurities is prepared by a process in which a starting europium halide is heated to fuse in the presence of a halogen source and then cooled to give the fused solid.

9 Claims, No Drawings

PROCESS FOR PREPARING FUSED SOLID OF EUROPIUM HALIDE

FIELD OF THE INVENTION

The present invention relates to a process for preparing fused solid of europium halide of high purity. In particular, the invention relates to fused solid of europium halide favorably employable as an evaporation source in a vapor-deposition process by which the europium halide is deposited on a substrate to form a layer thereof.

BACKGROUND OF THE INVENTION

The europium halide is generally known as a material for preparing an europium activated phosphor. For example, a phosphor screen produced by a process disclosed in WO No. 01/0356 A1 comprises a substrate and a stimulable europium-activated cesium halide phosphor layer formed thereon by a two vapor source deposition process in which a cesium halide and an europium compound such as an europium halide are used as evaporation sources. In the disclosed deposition process, the cesium halide (which is a matrix component of the phosphor) and the europium compound (which is an activator component of the phosphor) are simultaneously heated, vaporized, and reacted with each other to form the phosphor, which is immediately deposited and accumulated on the substrate to form a phosphor layer.

The europium halide generally is in the form of powder and is hygroscopic. If the powdery europium halide absorbs water from the surrounding atmosphere, the water contained in the powdery europium halide is liable to cause bumping in the evaporation-deposition process. Accordingly, it is difficult to form a deposited layer having a uniform phosphor composition.

Further, when the europium halide is heated in an atmosphere containing water vapor or gaseous oxygen, not a small amount of an europium oxyhalide is produced. It is, therefore, difficult to obtain a pure fused solid of an europium halide having little europium oxyhalide by merely heating and fusing the powdery europium halide.

There are known various stimulable phosphors. When the stimulable phosphor is exposed to radiation such as X-rays, it absorbs and stores a portion of the radiation energy. The stimulable phosphor then emits light according to the level of the stored energy when exposed to stimulating rays. A radiation image storage panel (often referred to as stimulable phosphor sheet) is a sheet comprising the stimulable phosphor, and has a basic structure comprising a support and a stimulable phosphor layer.

If the stimulable phosphor layer of the storage panel is formed by the vacuum deposition process, it consists essentially of the stimulable phosphor alone. In that phosphor layer, there are cracks among columnar crystals of the phosphor. Because of the cracks, the stimulating rays can stimulate the phosphor efficiently and the emitted light can be collected efficiently, too. Consequently, the storage panel having the vacuum deposited phosphor layer has high sensitivity. In addition, since the cracks prevent the stimulating rays from diffusing parallel to the layer, the storage panel can give a reproduced image with high sharpness.

The radiation image storage panel is advantageously employed in a radiation image recording and reproducing method, which has been widely used in practice. The method comprises the steps of causing the stimulable phosphor of the storage panel to absorb radiation energy having passed through an object or having radiated from an object, so that radiation image information of the object is temporarily recorded in the panel; sequentially exciting the stimulable phosphor with a stimulating rays such as a laser beam to emit stimulated light; and photoelectrically detecting the emitted light to obtain electric signals giving the image information.

The applicants have now found that, if the phosphor layer of the panel is formed by the vapor deposition process in which europium halide containing not a small amount of an europium oxyhalide is used as the evaporation source, the vaporization rate (i.e., a rate of vapor flow emitted from the source) is rendered so unstable that the deposited layer cannot have a uniform phosphor composition. Further, since the europium halide is contaminated with the impurities, a pure phosphor layer cannot be produced. A radiation image storage panel having the impure phosphor layer is liable to give a radiation image of poor quality.

Further, if the content of water in the europium halide is high, troubles such as bumping are often observed in the evaporation-deposition process, and furthermore, the partial pressure of water increases to make the deposition atmosphere so unstable that columnar crystals of the phosphor in the resultant layer are formed in undesirable shapes and that the emission is not evenly given off of the whole surface of the layer ("uneven emission") when the whole phosphor layer is stimulated.

SUMMARY OF THE INVENTION

An object of the present invention is to provide a process for preparing fused solid of an europium halide of high purity.

Another object of the invention is to provide fused solid of an europium halide having high purity to be suitably used as the evaporation source for preparing a stimulable phosphor layer of a radiation image storage panel.

The present invention resides in a process for preparing fused solid of an europium halide, wherein a starting europium halide is heated to fuse in the presence of a halogen source and then cooled to give the fused solid.

In the invention, the term of "europium halide" means a compound represented by the following formula (I):

$$EuX_m \qquad (I)$$

in which X is at least one halogen selected from the group consisting of F, Cl, Br and I; and m is a number satisfying the condition of $2.0 \leq m \leq 3.0$.

The invention further resides in fused solid of an europium halide containing an europium oxyhalide in an amount of at most 10.0 wt. %, preferably at most 6.0 wt. %, more preferably at most 3.0 wt. %, most preferably at most 1.0 wt. %.

DETAILED DESCRIPTION OF THE INVENTION

In the process of the invention for preparing fused solid europium halide, an ammonium halide is preferably added and mixed as the halogen source in the europium halide. The weight ratio of the added ammonium halide to the europium halide is preferably in the range of 0.1/10 to 10/10. The ammonium halide preferably comprises the same halogen as the europium halide does. The halogen is preferably bromine.

The mixture of europium halide and ammonium halide is then heated to fuse preferably under an atmosphere in which water and oxygen are contained in amounts of at most $5.0\times10^{-5}$ mol/L and at most $1.0\times10^{-5}$ mol/L, respectively. The atmosphere preferably is an inert or reducing gas atmosphere. The fused europium halide is then preferably cooled under a vacuum or under an inert or reducing gas atmosphere.

The starting materials such as the europium halide and ammonium halide are is preferably dried before the mixture is heated to fused, particularly, at a temperature of 50 to 400° C. under a vacuum of 100 Pa or less.

The europium halide and the ammonium halide are preferably individually dried, particularly at a temperature of 50 to 400° C. under a vacuum, before they are mixed.

It is also preferred that the europium halide be heated to fuse under an atmosphere in which halogen gas or hydrogen halide gas is contained as the halogen source. In that case, the halogen gas or the hydrogen halide gas is contained in the atmosphere preferably in an amount of $1\times10^{-6}$ to $1\times10^{5}$ Pa. The halogen gas or the hydrogen halide gas preferably comprises the same halogen as the europium halide does. The halogen is preferably bromine.

Also in that case, the europium halide is preferably heated to fuse under an atmosphere in which water and oxygen are contained in amounts of at most $5.0\times10^{-5}$ mol/L and at most $1.0\times10^{-5}$ mol/L, respectively. The atmosphere is preferably an inert or reducing gas atmosphere in which the halogen gas or the hydrogen halide gas is contained. The fused europium halide is then preferably cooled under a vacuum or under an inert or reducing gas atmosphere.

The europium halide is preferably dried, particularly at a temperature of 50 to 400° C. under a vacuum of 100 Pa or less, before it is heated to fuse.

Thus prepared fused solid europium halide contains europium oxyhalide and water preferably in amounts of at most 10 wt. %, more preferably at most 0.5 wt. %, respectively. The content of europium oxyhalide is more preferably at most 3 wt. %, and further preferably at most 1 wt. %.

In the process for preparation of a radiation image storage panel, the phosphor preferably contains europium as the activator and is more preferably an europium activated alkali metal halide stimulable phosphor represented by the following formula (II):

$M^I X . a M^{II} X'_2 . b M^{III} X''_3 : z E u$     (II).

in which $M^I$ is at least one alkali metal selected from the group consisting of Li, Na, K, Rb and Cs; $M^{II}$ is at least one alkaline earth metal or divalent metal selected from the group consisting of Be, Mg, Ca, Sr, Ca, Ni, Cu, Zn and Cd; $M^{III}$ is at least one rare earth element or trivalent metal selected from the group consisting of Sc, Y, La, Ce, Pr, Nd, Pm, Sm, Eu, Gd, Th, Dy, Ho, Er, Tm, Yb, Lu, Al, Ga and In; each of X, X' and X" is independently at least one halogen selected from the group consisting of F, Cl, Br and I; and a, b and z are numbers satisfying the conditions of $0\leq a<0.5$, $0\leq b<0.5$ and $0<z<1.0$, respectively.

The process of the invention for preparing the fused solid of europium halide is explained below in detail.

The europium halide is a compound represented by the following formula (I):

$EuX_m$     (I)

in which X is at least one halogen selected from the group consisting of F, Cl, Br and I; and m is a number satisfying the condition of $2.0\leq m\leq 3.0$. The europium ions contained in the compound may be divalent ions, trivalent ions or a mixture thereof. The europium halide is generally in the form of powder.

As the halogen source, an ammonium halide ($NH_4X'$ in which X' is F, Cl, Br and/or I), a gaseous halogen (F, Cl, Br and/or I) or a gaseous hydrogen halide (HX') can be used. The ammonium halide may be used in the solid state, or otherwise it may be vaporized and then used in the gas state. The halogen and hydrogen halide can be can be used in the form of solid or liquid. The ammonium halide, gaseous halogen or gaseous hydrogen halide preferably comprises the same halogen as the europium halide does. The halogen is preferably bromine (namely, X and X' are preferably Br).

In the case where the ammonium halide is used in the solid state, both the starting $EuX_m$ and $NH_4X'$ are preferably beforehand dried to reduce water content as much as possible. For example, they are heated to dry at a temperature of 50 to 400° C. under a vacuum for about 1 to 10 hours in a vacuum drying apparatus.

The dried $EuX_m$ and $NH_4X'$ (which are in the form of powder) are then mixed preferably in dry air. The weight ratio of $NH_4X'$ to the $EuX_m$ material preferably is in the range of 0.1/10 to 10/10, more preferably in the range of 1/10 to 5/10.

The starting mixture of the $EuX_m$ and $NH_4X'$ is then put in a heat-resistant container (such as an alumina crucible, a platinum crucible or a quartz boat), placed in the core of an electric furnace, and heated to fuse at a temperature higher than the melting point of $EuX_m$. Before the mixture is heated to fuse, the core where the mixture is placed is preferably dried. For example, it may be heated to dry at a temperature of 50 to 400° C. under a vacuum of 100 Pa or less, preferably 10 Pa or less, for 10 minutes to 12 hours.

The temperature at which the mixture is fused generally is in the range of 500 to 2,000° C. The atmosphere under which the mixture is fused is generally an atmosphere of inert gas (such as nitrogen gas) or reducing gas (such as hydrogen gas), and it contains water and oxygen generally in amounts of at most $5.0\times10^{-5}$ mol/L and at most $1.0\times10^{-5}$ mol/L, preferably in amounts of at most $5.0\times10^{-6}$ mol/L and at most $1.0\times10^{-6}$ mol/L, respectively. The time for which the mixture is fused generally is in the range of 30 minutes to 12 hours.

While heated to fuse, $EuX_m$ partly reacts with water and oxygen remaining in the starting material to change into europium oxyhalide (EuOX) and consequently comes to equilibrium with the formed EuOX. However, since the starting material contains the halogen source of $NH_4X'$, the equilibrium lies to the $EuX_m$ side. Without $NH_4X'$, EuOX would be produced in a larger amount. This means that the reaction between $EuX_m$ and $H_2O$ or $O_2$ can be controlled by the halogen source of $NH_4X'$ to reduce the by-product EuOX. If an excess $NH_4X'$ is mixed, $EuX_m$ is often converted into $EuX_3$. The halogen source of $NH_4X'$ can also convert EuOX originally contained in the starting $EuX_m$ into $EuX_2$.

Thus fused $EuX_m$ is then cooled to give a fused solid. The cooling procedure is preferably performed under a vacuum or under an inert or reducing gas atmosphere. The added $NH_4X'$ is sublimated into gas while heated, and the gas is removed while cooled.

The valence (m) of Eu contained in thus fused solid of $EuX_m$ is often different from that in the starting $EuX_m$. The difference depends on various conditions such as the amount of $NH_4X'$ and the melting conditions. The resultant fused solid can be formed in an optional shape (for example, in a tablet) by selecting the shape of the heat-resistant container (such as a crucible). If wrapped with an aluminum film under a dry gas atmosphere to be kept in a vacuum, the fused solid can be stored for several weeks to several months.

As described above, it is also possible to use a solid, liquid or gaseous halogen (F, Cl, Br and/or I) or a hydrogen halide gas (HX') as the halogen source.

In that case, the starting $EuX_m$ is heated to fuse under an atmosphere in which, for example, $X'_2$ gas or HX' gas is contained. Preferably, the atmosphere is an inert or reducing gas atmosphere containing $X'_2$ gas or HX' gas. The partial pressure of $X'_2$ or HX' gas preferably is in the range of $1 \times 10^{-6}$ to $1 \times 10^5$ Pa in the atmosphere. The starting $EuX_m$ may be heated to fuse under an atmosphere in the presence of a liquid halogen ($Br_2$) or a solid halogen ($I_2$) in place of the $X'_2$ or HX' gas. Also in that atmosphere, water and oxygen are contained generally in amounts of at most $5.0 \times 10^{-5}$ mol/L and at most $1.0 \times 10^{-5}$ mol/L, preferably in amounts of at most $5.0 \times 10^{-6}$ mol/L and at most $1.0 \times 10^{-6}$ mol/L, respectively.

The starting $EuX_m$ is heated to fuse and then cooled under the aforementioned conditions, to prepare the fused solid of $EuX_m$. Before the starting $EuX_m$ is heated to fuse, the powdery starting $EuX_m$ and/or the core of the furnace where the starting $EuX_m$ is placed may be dried.

In this way, the fused solid of an europium halide ($EuX_m$) of high purity can be obtained. The fused solid of an europium halide ($EuX_m$) contains an europium oxyhalide (EuOX) and water preferably in amounts of at most 10 wt. % and at most 0.5 wt. %, respectively. The content of the europium oxyhalide (EuOX) is more preferably at most 3 wt. %, further preferably at most 1 wt. %. As described hereinafter in Examples, the EuOX content is determined by the X-ray diffractometry in which the ratio of the integrated intensity of the signal attributed to EuOX (100 face) per that attributed to $EuX_2$ (211 face) in the X-ray diffraction pattern is calculated and compared with the beforehand obtained calibration curve. As also described hereinafter in Examples, the content of water is determined by the thermogravimetric analysis in which the sample loses in terms of weight while heated at 50 to 150° C. is measured.

In the following description, the process for preparing a radiation image storage panel utilizing the used solid of $EuX_m$ of the invention is explained in detail.

In the process, the phosphor layer of the storage panel is formed by a multi-vapor deposition (co-deposition) process. A substrate on which vapors are deposited is normally used as a support of the radiation image storage panel, and hence can be optionally selected from known materials conventionally used as a support of a storage panel. The substrate preferably is a sheet of quartz glass, sapphire glass, metal (e.g., aluminum, iron, tin, chromium) or resin (e.g., aramide). For improving the sensitivity or the image quality (e.g., sharpness and graininess), a conventional radiation image storage panel often has a light-reflecting layer containing a light reflecting material such as titanium dioxide or a light-absorbing layer containing a light-absorbing material such as carbon black. These auxiliary layers can be provided on the storage panel, according to the aim and the use. Further, in order to promote growth of the columnar crystals, a great number of very small convexes or concaves may be provided on the substrate surface on which the vapor is deposited. If an auxiliary layer such as a subbing layer (adhesive layer), a light-reflecting layer or a light-absorbing layer is formed on the deposited-side surface of the substrate, the convexes or concaves may be provided on the surface of the auxiliary layer.

The energy-storing phosphor (typically, stimulable phosphor) used in the storage panel is activated by at least europium, and preferably is a stimulable phosphor giving off stimulated emission in the wavelength region of 300 to 500 nm when exposed to stimulating rays in the wavelength region of 400 to 900 nm.

The phosphor is particularly preferably an europium activated alkali metal halide stimulable phosphor represented by the following formula (II):

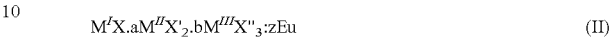

$$M^I X.aM^{II} X'_2.bM^{III} X''_3 : zEu \qquad (II)$$

in which $M^I$ is at least one alkali metal selected from the group consisting of Li, Na, K, Rb and Cs; $M^{II}$ is at least one alkaline earth metal or divalent metal selected from the group consisting of Be, Mg, Ca, Sr, Ba, Ni, Cu, Zn and Cd; $M^{III}$ is at least one rare earth element or trivalent metal selected from the group consisting of Sc, Y, La, Ce, Pr, Nd, Pm, Sm, Eu, Gd, Tb, Dy, Ho, Er, Tm, Yb, Lu, Al, Ga and In; each of X, X' and X'' is independently at least one halogen selected from the group consisting of F, Cl, Br and I; and a, b and z are numbers satisfying the conditions of $0 \leq a < 0.5$, $0 \leq b < 0.5$ and $0 < z < 1.0$, respectively.

The phosphor of the formula (II) preferably contains at least Cs and Br as $M^I$ and X, respectively. Further, the phosphor may contain, if needed, metal oxide such as aluminum oxide, silicon dioxide and zirconium oxide as an additive in an amount of 0.5 mol or less based on 1 mol of $M^I$.

In the multi-vapor deposition (co-deposition) process for forming the phosphor layer, the fused solid of $EuX_m$ is used as an evaporation source giving an activator of the phosphor. Besides the activator source of the fused solid of $EuX_m$, at least one evaporation source containing a matrix component of the phosphor is used. According to the composition of the desired phosphor, the matrix source may consist of the matrix component alone or otherwise may be a mixture thereof with additives. The matrix component may be either the matrix compound itself or a mixture of two or more substances that react with each other to produce the matrix compound. Three or more sources may be used. The multi-vapor deposition is preferred because the vaporization rate of each source can be independently controlled even if the materials have very different vapor pressures.

The fused solid of $EuX_m$ of the invention used as the evaporation source contains EuOX generally in an amount of at most 10 wt. %. The content of EuOX preferably is at most 3 wt. %, further preferably at most 1 wt. %. Such a low EuOX content is effective to stabilize the vaporization rate.

Further, the fused solid of $EuX_m$ contains water preferably in an amount of at most 0.5 wt. %. Further, other phosphor materials such as the matrix source contain water also preferably in an amount of at most 0.5 wt. %. If hygroscopic substances such as CsBr and EuBr are used as the phosphor materials, they are liable to contain a considerable amount of water. For preventing the evaporation sources from bumping, it is important to reduce the water content. Water contained in the materials can be removed, for example, by heating them at a temperature of 100 to 300° C. under a reduced pressure, or by heating to fuse them at a temperature above their melting points for several ten minutes to several hours under a dry atmosphere such as nitrogen gas atmosphere.

Furthermore, the fused solid of $EuX_m$ contains $Eu^{2+}$ preferably in a molar ratio of 70% or more. The reason of that is because the stimulated (and also instant) emission is given off from a phosphor activated by $Eu^{2+}$ although an Eu compound generally contains both $Eu^{2+}$ and $Eu^{3+}$. In other words, the number represented by m in the above formula preferably satisfies the condition of $2.0 \leq m \leq 2.3$. It is theoretically preferred that m be exactly 2.0. However, if m is nearly 2.0, the fused solid of $EuX_m$ is liable to be contaminated with oxygen. Therefore, when m is nearly 2.2 and when the content of halogen X is relatively high, the fused solid of $EuX_m$ is practically stable. The halogen X preferably is bromine.

The evaporation source preferably has a relative density of 80% or more, more preferably 90% to 100%. The term "relative density" here means the ratio of the density of the source to the specific density of the phosphor or material. If the relative density is low (namely if the source is in the form of powder), the powder is often sprinkled during vaporization and/or the source is liable to be evaporated so unevenly that the deposited phosphor layer has uneven thickness. Therefore, for ensuring stable evaporation and deposition, the relative density is preferably in the particular range. In order to control the density in the above range, generally the evaporation source material is pressed with a pressure of 20 Mpa or more or otherwise is heated to fuse at a temperature above the melting point to shape a tablet. The evaporation source, however, is not always required to be in the shape of a tablet.

The evaporation source, particularly the source containing the matrix material, contains impurities of alkali metal (alkali metals other than ones constituting the phosphor) preferably in a content of at most 10 ppm and impurities of alkaline earth metal (alkaline earth metals other than ones constituting the phosphor) preferably in a content of at most 1 ppm. Such preferred evaporation source can be prepared from materials containing impurities as less as possible. In this way, a deposited layer less contaminated with the impurities can be produced, and thus produced layer gives an increased amount of emission.

Subsequently, the prepared evaporation sources and the substrate are placed in a vacuum evaporation-deposition apparatus, and the apparatus is then evacuated to give an inner pressure of $1 \times 10^{-6}$ to $1 \times 10^{-2}$ Pa. The deposition process may be immediately carried out with the inner pressure kept, or otherwise it may begin after an inert gas such as Ar, Ne or $N_2$ gas is introduced into the apparatus with the inner pressure kept in the range of $1 \times 10^{-6}$ to $1 \times 10$ Pa. A partial pressure of water ($H_2O$) in the deposition atmosphere is controlled preferably at $7.0 \times 10^{-3}$ Pa or less by means of, for example, an exhaust system comprising a combination of a diffusion pump (or cryopump) and a cold trap.

For preparing the deposited phosphor layer, two or ore evaporation sources separately containing at least the matrix material and the activator material of the phosphor are individually subjected to, for example, application of electron beams or resistance heating. Some of the sources may be exposed to electron beams while the others may be heated with resistance heaters. The substances thus vaporized from the sources are cooperatively deposited on the substrate. The electron beam and the resistance heating may be applied to one source in combination.

Three or more evaporation sources may be used, if needed. In that case, for example, one of them contains the matrix component, another contains one or more activator components, and still another contains one or more additive components. All the sources may be vaporized in the same manner, or otherwise two or more of them are in one manner while the others are in another. Further, all the sources may be vaporized in different manners. As described above, each source may be vaporized with an electron beam and resistance heating in combination.

The multi-vapor deposition (co-deposition) process is explained below in detail, by way of example, in the case where two evaporation sources (one of which contains the matrix material and the other of which contains the activator material) are exposed to electron beams to vaporize.

In the vacuum evaporation-deposition apparatus, two electron beams generated by two electron guns are individually applied onto the evaporation sources. The accelerating voltage of each electron beam preferably is in the range of 1.5 kV to 5.0 kV. By applying the electron beams, the evaporation sources of matrix and activator materials are heated, vaporized, reacted with each other to form the aimed phosphor, which is deposited on the substrate. In this step, the accelerating voltage of each electron beam may be adjusted to control the vaporization rate of each source. The deposition rate, which means how fast the formed phosphor is deposited and accumulated on the substrate, generally is in the range of 0.1 to 1,000 μm/minute, preferably is in the range of 1 to 100 μm/min. Each evaporation source may be heated with a resistance heater. Otherwise, one of the sources may be exposed to the electron beam while the other may be heated with the resistance heater.

If the fused solid of $EuX_m$ of the invention is used as the evaporation source of activator material, the phosphor can be deposited and accumulated in a stable rate without troubles such as bumping. Consequently, an even deposited phosphor layer can be formed.

The application of electron beams may be repeated twice or more to form two or more phosphor layers. The substrate may be cooled or heated, if needed, during the deposition process. After the deposition process is complete, the formed phosphor layer may be annealed.

In place of two electron guns, only one electron gun may be used in that case, the two evaporation sources are placed close together, and an electron beam emitted from the gun is controlled with a two-point controller so that it can be alternatively applied to the sources.

Before preparing the above deposited layer of the stimulable phosphor, another deposited layer consisting of the phosphor matrix only may be beforehand formed. If so, the resulting phosphor layer is well crystallized. In thus formed layers, the additives such as the activator contained in the phosphor-deposited layer are diffused into the matrix-deposited layer while they are heated during the deposition and/or during the heating treatment performed after the deposition, and consequently the interface between the layers is not always clear.

In the case where resistance heating is used, the evaporation sources are placed in an evaporation-deposition apparatus equipped with a resistance heater. Electric current is then supplied to the heater, so that the sources are heated to vaporize the matrix and activator materials of the phosphor.

Thus produced phosphor layer consists of the stimulable phosphor in the form of columnar crystals grown almost parallel to the thickness direction. The thickness of the phosphor layer normally is in the range of 50 to 1,000 μm, preferably in the range of 200 to 700 μm.

It is not necessary for the substrate to be used as a support of the radiation image storage panel. For example, after formed on the substrate, the deposited layer (film) is peeled off of the substrate and then laminated on the support with an adhesive to prepare the phosphor layer. Otherwise, the support may be omitted.

Preferably, a protective film is provided on the surface of the deposited phosphor layer, so as to ensure good handling of the radiation image storage panel in transportation and to avoid deterioration. The protective film is preferably transparent so as not to prevent the stimulating rays from coming in or not to prevent the emission from coming out. Further, for protecting the storage panel from chemical deterioration and physical damage, the protective film preferably is chemically stable, physically strong, and of high moisture proof.

The protective film can be provided by coating the phosphor layer with a solution in which a transparent organic polymer (e.g., cellulose derivatives, polymethyl methacrylate, fluororesins soluble in organic solvents) is dissolved in a solvent, by placing a beforehand prepared sheet for the protective film (e.g., a film of organic polymer such as polyethylene terephthalate, a transparent glass plate) on the phosphor film with an adhesive, or by depositing vapor of inorganic compounds on the phosphor film.

Various additives may be dispersed in the protective film. Examples of the additives include light-scattering fine particles (e.g., particles of magnesium oxide, zinc oxide, titanium dioxide and alumina), a slipping agent (e.g., powders of perfluoroolefin resin and silicone resin) and a crosslinking agent (e.g., polyisocyanate). The thickness of the protective film is generally in the range of about 0.1 to 20 μm (if the film is made of polymer material) or in the range of about 100 to 1,000 μm (if the film is made of inorganic material such as silicate glass).

For enhancing resistance to stain, a fluororesin layer may be provided on the protective film. The fluororesin layer can be form by coating the surface of the protective film with a solution in which a fluororesin is dissolved or dispersed in an organic solvent, and by drying the applied solution. The fluororesin may be used singly, but a mixture of the fluororesin and a film-forming resin is normally employed. In the mixture, an oligomer having polysiloxane structure or perfluoroalkyl group can be further added. In the fluororesin layer, fine particle filler may be incorporated to reduce blotches caused by interference and to improve the quality of the resultant image. The thickness of the fluororesin layer is generally in the range of 0.5 to 20 μm.

For forming the fluororesin layer, additives such as a crosslinking agent, a film-hardening agent and an antiyellowing agent can be used. In particular, the cross-linking agent is advantageously employed to improve durability of the fluororesin layer.

Thus, a radiation image storage panel can be prepared. The storage panel may be in known various structures. For example, in order to improve the sharpness of the resultant image, at least one of the films (layers) may be colored with a colorant which does not absorb the emission but the stimulating light.

It is noted that the phosphor is not restricted to the stimulable phosphor. Further, the radiation image storage panel may be of another type, for example, a storage panel disclosed in Japanese Patent Provisional Publication No. 2001-255610. That panel comprises an energy-storing phosphor (which stores radiation energy), and is used in combination with a phosphor screen comprising a radiation-absorbing phosphor which absorbs radiation and emits ultraviolet or visible light.

In the following examples, the EuOBr content in each sample was determined by the X-ray diffractiometry. First, an X-ray was applied to the sample to obtain an X-ray diffraction pattern, and then the ratio of the integrated intensity of the signal attributed to EuOBr (100 face) per that of the signal attributed to $EuBr_2$ (211 face) in the obtained pattern was calculated and compared with the following calibration curve beforehand obtained from an independently prepared referential $EuOBr.EuBr_2$ mixture.

Calibration Curve:

EuOBr content (wt. %)=52.0× ratio of the integrated intensity of EuOBr (100 face)/that of $EuBr_2$ (211 face)

The content of water in each sample was determined by means of a differential thermogravimetric simultaneous measuring apparatus (TG/DTA320, Seiko electronics Corp., Ltd.) according to the thermogravimetric analysis. In the analysis, how much weight the sample lost while heated from room temperature to 300° C. at the elevation rate of 10° C./minute was measured.

EXAMPLE 1

(1) Preparation of Fused Solid of Europium Bromide

Powdery ammonium bromide ($NH_4Br$, Kanto Kagaku) was dried under a vacuum at 150° C. for 1 hour in a vacuum drying apparatus. The dried ammonium bromide was then added to europium bromide ($EuBr_m$, m=2.2; Furuuchi Chemical Corporation) so that the weight ratio of $EuBr_m$:$NH_4Br$ would be 10:1, and mixed well under dry air. The prepared mixture contained water in an amount of 0.6 wt. % or more. The mixture was placed in a platinum crucible having dual structure, and the crucible was then put on a quartz boat. The quartz boat was placed in the core of a tube furnace, and dried at 200° C. under a vacuum of 54 to 6.6 Pa for 1 hour. Thus dried powdery mixture contained water in an amount of 0.33 wt. % or less.

After a nitrogen gas was introduced into the core of the furnace, the dried powdery mixture was heated to fuse at 800° C. for 1 hour. Thus fused material was left to cool while the core was evacuated for 30 minutes. In this way, fused solid of europium bromide in the form of a tablet (diameter: 30 mm, thickness: 5 mm) was obtained.

The contents of the atmosphere in the core before and after the vacuum drying (before the mixture was heated to fuse) are set forth in Table 1. The water content shown in Table 1 was calculated on the assumption that the pressure remaining in the core was attributed to water, and the oxygen and nitrogen contents were calculated on the assumption that the pressure remaining in the core was attributed to air ($N_2$:$O_2$=80:20).

TABLE 1

|  | Total pressure (Pa) | $H_2O$ (mol/L) | $O_2$ (mol/L) | $N_2$ (mol/L) |
| --- | --- | --- | --- | --- |
| Before | <54 | $<2.2 \times 10^{-5}$ | $<4.4 \times 10^{-6}$ | $<1.8 \times 10^{-5}$ |
| After | <6.6 | $<2.8 \times 10^{-6}$ | $<5.6 \times 10^{-7}$ | $<2.3 \times 10^{-6}$ |

(2) Preparation of Radiation Image Storage Panel

Powdery CsBr (75 g) was placed in a powder molding zirconia die (inner diameter: 35 mm) and compressed in a powder molding press (Table press TB-5 type, NPA system Corp.) at a pressure of 50 MPa, to produce a tablet (diameter: 35 mm, thickness: 20 mm). The pressure applied to the powdery CsBr was approx. 40 MPa. The produced tablet was dried in a vacuum drying apparatus at 200° C. for 2 hours.

A synthetic quartz substrate (support) was washed successively with an aqueous alkaline solution, purified water, and isopropyl alcohol, and then mounted to a substrate holder in an evaporation apparatus. In the apparatus, the CsBr and $EuBr_m$ tablets were placed in the predetermined sites. The apparatus was then evacuated with a combination of a cryopanel and a diffusion pump, to reach $1 \times 10^{-3}$ Pa.

In the apparatus, the substrate was then heated to 200° C. by means of a sheath heater placed on the back side of the substrate. Electron beams from electron guns (accelerating voltage: 4.0 kV) were individually applied onto the tablets, to co-deposit and accumulate CsBr:Eu stimulable phosphor at the rate of 4 μm/minute. In applying the electron beams, the emission currents supplied to the electron guns were controlled to 100 mA (for CsBr) and 50 mA (for $EuBr_m$), so that the Bu/Cs molar concentration ratio in the formed phosphor was 0.003/1.

After the evaporation-deposition process was complete, the inner pressure was returned to atmospheric pressure, and the substrate was taken out of the apparatus. On the substrate, a deposited layer (thickness: approx. 400 μm, area: 10 cm×10 cm) consisting of columnar phosphor crystals aligned densely and perpendicularly was formed.

Thus, a radiation image storage panel having a support (substrate) and a deposited phosphor layer was produced by the multi-vapor deposition process.

EXAMPLE 2

The procedures of Example 1 (1) were repeated except for increasing the ammonium bromide to change the weight ratio of $EuBr_m:NH_4Br$ into 10:2, to prepare a tablet of fused solid of europium bromide. Except for using the thus prepared tablet, the procedures of Example 1 (2) were repeated to produce a radiation image storage panel having a support and a phosphor layer.

EXAMPLE 3

The procedures of Example 1 (1) were repeated except for increasing the ammonium bromide to change the weight ratio of $EuBr_m:N_4Br$ into 10:3, to prepare a tablet of fused solid of europium bromide. Except for using the thus prepared tablet, the procedures of Example 1 (2) were repeated to produce a radiation image storage panel having a support and a phosphor layer.

EXAMPLE 4

The procedures of Example 1 (1) were repeated except for increasing the ammonium bromide to change the weight ratio of $EuBr_m:NH_4Br$ into 10:6, to prepare a tablet of fused solid of europium bromide. Except for using the thus prepared tablet, the procedures of Example 1 (2) were repeated to produce a radiation image storage panel having a support and a phosphor layer.

COMPARISON EXAMPLE 1

The procedures of Example 1 (1) were repeated except that ammonium bromide was not added, to prepare a tablet of fused solid of europium bromide. Except for using the thus prepared tablet, the procedures of Example 1 (2) were repeated to produce a radiation image storage panel for comparison having a support and a phosphor layer.

COMPARISON EXAMPLE 2

Powdery europium bromide was compressed in the powder molding press to produce a tablet. Except for using the thus prepared tablet as the $EuBr_m$ evaporation source, the procedures of Example 1 (2) were repeated to produce a radiation image storage panel for comparison having a support and a phosphor layer.

[(Evaluation of Fused Solid of Europium Bromide (1)]

In the electron beam-evaporation process, the vaporization rate (relative rate of vapor flow) of $EuBr_m$ was measured with a quartz crystal oscillator. The results are set forth in Table 2.

TABLE 2

| | $EuBr_m/NH_4Br$[1] | Impurities[2] | | Vaporization rate | | |
|---|---|---|---|---|---|---|
| | (g/g) | EuOBr | $H_2O$ | $S^{[3]}$ (nm/s) | $F^{[4]}$ (nm/s) | $T^{[5]}$ (min.) |
| Ex. 1 | 10/1 | 5.6 | ≦0.5 | 0.26 | ≦3.5 | ≦4.5 |
| Ex. 2 | 10/2 | 2.6 | ≦0.5 | 0.15 | ≦2.5 | ≦4 |
| Ex. 3 | 10/3 | 0.7 | ≦0.5 | 0.04 | ≦1.5 | ≦3 |
| Ex. 4 | 10/6 | 0.6 | ≦0.5 | 0.07 | ≦0.5 | ≦1.5 |
| Com. 1 | 10/0 | 23.2 | ≦0.5 | —[6] | ≧5.0 | >4.5 |
| Com. 2 | — | 19.2 | ≧0.6 | Bumped | Unmeasurable | Uncontrollable |

Remarks:
[1] $NH_4Br$ was dried before added to $EuBr_m$.
[2] Impurities in the $EuBr_m$ evaporation source are set forth. The contents of EuOBr and water are shown in terms of wt. %.
[3] The "S" stands for a steady rate of vaporization.
[4] The "F" stands for a fluctuation of the rate.
[5] The "T" stands for time it took the vaporization to reach the steady state.
[6] The vaporization in Comparison Example 1 did not reach the steady state.

Table 2 clearly indicates that each fused solid of $EuBr_m$ of the invention (prepared in each of Examples 1 to 4), which was prepared in the presence of $NH_4Br$, contained EuOBr much less than that for comparison (prepared in Comparison Example 1), which was prepared in the absence of NH$_4$Br. Consequently, the vaporization in each example was remarkably stabilized.

In the fused solid of EuBr$_m$ for comparison (prepared in Comparison Example 1), the composition at the central part was very different from that at the peripheral part. The central part mainly comprised EuOBr, and hence the vaporization from that part was hardly stabilized. The EuBr$_m$ tablet not having been fused (prepared in Comparison Example 2) also contained EuOBr too much to control the vaporization, and further contained water enough to cause bumping in the evaporation-deposition process.

The comparison of the results of Comparison Examples 1 and 2 teaches that, if heated to fuse in the absence of NH$_4$Br, EuBr$_m$ reacts with H$_2$O and O$_2$ slightly remaining in the product to produce EuOBr and as a result to increase the EuOBr content.

EXAMPLES 5 TO 8

The procedures of each of Examples 1 to 4 were repeated except that the evaporation sources were heated with resistance heaters (current: 120 A) instead of being exposed to electron beams, to produce a radiation image storage panel having a support and a phosphor layer according to the invention.

COMPARISON EXAMPLES 3 AND 4

The procedures of each of Comparison Examples 1 and 2 were repeated except that the evaporation sources were heated with resistance heaters (current: 120 A) instead of being exposed to electron beams, to produce a radiation image storage panel for comparison having a support and a phosphor layer.

[Evaluation of Fused Solid of Buropium Bromide (2)]

In the resistance heating-evaporation process, the vaporization rate (relative speed of vapor flow) of EuBr$_m$ was measured with a quartz crystal oscillator. The results are set forth in Table 3.

Table 3 indicates that, even if the evaporation sources were heated with resistance heaters instead of being exposed to electron beams, the results were similar to the above. Namely, each fused solid of EuBr$_m$ of the invention (prepared in each of Examples 5 to 8), which was prepared in the presence of NH$_4$Br according to the invention, contained EuOBr much less than that for comparison (prepared in Comparison Example 3) prepared in the absence of NH$_4$Br and the comparison tablet (prepared in Comparison Example 4) not having been fused. Consequently, the vaporization in each example was remarkably stabilized.

REFERENCE EXAMPLE 1

The procedures of Example 3 were repeated except that ammonium bromide was not dried under a vacuum and that the core of tube furnace was not dried before heating to fuse the mixture, to prepare a tablet of fused solid of europium bromide. Except for using the thus prepared tablet, the procedures of Example 3 were repeated to produce a radiation image storage panel for comparison having a support and a phosphor layer.

REFERENCE EXAMPLE 2

The procedures of Example 7 were repeated except that ammonium bromide was not dried under a vacuum and that the core of tube furnace was not dried before heating to fuse the mixture, to prepare a tablet of fused solid of europium bromide. Except for using the thus prepared tablet, the procedures of Example 7 were repeated to produce a radiation image storage panel for comparison having a support and a phosphor layer.

[Evaluation of Fused Solid of Buropium Bromide (3)]

In the electron beam- or resistance heating-evaporation process, the vaporization rate (relative rate of vapor flow) of EuBr$_m$ was measured with a quartz crystal oscillator. The results are set forth in Table 4.

TABLE 3

| | EuBr$_m$/NH$_4$Br[1] | Impurities[2] | | Vaporization rate | | |
|---|---|---|---|---|---|---|
| | (g/g) | EuOBr | H$_2$O | S[3] (nm/s) | F[4] (nm/s) | T[5] (min.) |
| Ex. 5 | 10/1 | 5.6 | ≦0.5 | 0.25 | ≦0.18 | ≦5 |
| Ex. 6 | 10/2 | 2.6 | ≦0.5 | 0.12 | ≦0.16 | ≦4.5 |
| Ex. 7 | 10/3 | 0.7 | ≦0.5 | 0.15 | ≦0.09 | ≦3 |
| Ex. 8 | 10/6 | 0.6 | ≦0.5 | 0.11 | ≦0.10 | ≦3 |
| Com. 3 | 10/0 | 23.2 | ≦0.5 | 0.3 | — | Intermittently Bumped |
| Com. 4 | not fused | 19.2 | ≧0.6 | 0.25 | — | Intermittently Bumped |

Remarks:
[1] NH$_4$Br was dried before added to EuBr$_m$.
[2] Impurities in the EuBr$_m$ evaporation source are set forth. The contents of EuOBr and water are shown in terms of wt. %.
[3] The "S" stands for a steady rate of vaporization.
[4] The "F" stands for a fluctuation of the rate.
[5] The "T" stands for time it took the vaporization to reach the steady state.

TABLE 4

| | $EuBr_m/NH_4Br$ [1] | | Drying | | Water [2] (wt. %) | Impurities (wt. %) [3] | | Vaporization rate | | |
|---|---|---|---|---|---|---|---|---|---|---|
| | (g/g) | Evaporation | Core | $NH_4Br$ | | EuOBr | $H_2O$ | $S^{4)}$ (nm/s) | $F^{5)}$ (nm/s) | $T^{6)}$ (min.) |
| Ex. 3 | 10/3 | Electron beam | did | did | ≦0.33 | 0.7 | ≦0.5 | 0.04 | ≦1.5 | ≦3 |
| Ref. 1 | 10/3 | Electron beam | not | not | ≧0.60 | 12.5 | ≦0.5 | —[7] | ≧5.0 | >4.5 |
| Ex. 7 | 10/3 | Resistance heating | did | did | ≦0.33 | 0.7 | ≦0.5 | 0.15 | ≦0.09 | ≦3 |
| Ref. 2 | 10/3 | Resistance heating | not | not | ≦0.33 | 12.5 | ≦0.5 | 0.21 | — | Intermittently Bumped |

Remarks:
[1] $NH_4Br$ was dried before added to $EuBr_m$.
[2] The contents of water in the material mixtures are set forth.
[3] Impurities in the $EuBr_m$ evaporation source are set forth.
[4] The "S" stands for a steady rate of vaporization.
[5] The "F" stands for a fluctuation of the rate.
[6] The "T" stands for time it took the vaporization to reach the steady state.
[7] The vaporization in Reference Example 1 did not reach the steady state.

Table 4 clearly indicates that the fused solid of $EuBr_m$ of the invention (prepared in each of Example 3 or 7), which was prepared from a mixture containing water in an amount of 0.33 wt. % or less, contained EuOBr in such a small amount that the vaporization was stabilized, while the fused solid of $EuBr_m$ for comparison (prepared in Reference Example 1 or 2), which was prepared from a mixture containing water in an amount of more than 0.5 wt. %, contained EuOBr so much that the vaporization was not stabilized.

EXAMPLE 9

The procedures of Example 8 were repeated except that Ar gas was introduced into the evacuated apparatus to a vacuum of 2 Pa, to produce a radiation image storage panel having a support and a phosphor layer.

[Evaluation of Fused Solid of Europium Bromide (4)]

In the resistance heating-evaporation process under a low vacuum with the inert gas, the vaporization rate (relative rate of vapor flow) of $EuBr_m$ was measured with a quartz crystal oscillator. The results are set forth in Table 5.

TABLE 5

| | Vacuum | Vaporization rate | | |
|---|---|---|---|---|
| | (Pa) | $S^{3)}$ (nm/s) | $F^{4)}$ (nm/s) | $T^{5)}$ (min.) |
| Ex. 9 | 2 | 0.10 | ≦0.15 | ≦3 |
| Ex. 8 | $1 \times 10^{-3}$ | 0.11 | ≦0.10 | ≦3 |

Remarks:
[1] In each of Examples 8 and 9, the ratio of $EuBr_m/NH_4Br$ contained in the fused solid was 10/6 in terms of g/g.
[2] In each of Examples 8 and 9, the contents of EuOBr and water in the fused solid were 0.6 wt. % or less and 0.5 wt. % or less, respectively.
[3] The "S" stands for a steady rate of vaporization.
[4] The "F" stands for a fluctuation of the rate.
[5] The "T" stands for time it took the vaporization to reach the steady state.

Table 5 indicates that, even if the evaporation was carried out by resistant heating under a low vacuum with the inert gas, the results were similar to the above. Namely, the fused solid of $EuBr_m$ of the invention, which was prepared in the presence of $NH_4Br$ according to the invention, contained EuOBr in such a small amount that the vaporization was remarkably stabilized even under a low vacuum.

In the invention, powdery europium halide is fused in the presence of halogen, particularly ammonium halide, and then cooled to prepare the fused solid of europium halide. Thus prepared fused solid of europium halide is of high purity, and contains europium oxyhalide in a remarkably reduced amount. If thus prepared fused solid of europium halide of the invention is used as an evaporation source in vapor deposition process to form a phosphor layer of a radiation image storage panel, the formed phosphor layer comprises uniform phosphor composition and hardly contains impurities.

What is claimed is:

1. A process for preparing fused solid of an europium bromide, wherein a powdery starting europium bromide is heated to fuse in the presence of a bromine source and then cooled to give the fused solid.

2. The process of claim 1, wherein the bromine source is an ammonium bromide which is heated simultaneously when the starting europium bromide is heated.

3. The process of claim 2, wherein the ammonium bromide is mixed with the starting europium bromide before they are heated.

4. The process of claim 2, wherein the ammonium bromide is used in a weight ratio of 0.1/10 to 10/10 based on an amount of the starting europium bromide.

5. The process of claim 2, wherein the starting europium bromide and ammonium bromide are dried separately or in the form of their mixture at a temperature of 50 to 400° C. and a pressure of 100 Pa or less before they are heated.

6. The process of claim 1, wherein the heating of the starting europium bromide is performed under such conditions of a water vapor content of $5.0 \times 10^{-5}$ mol/L or less and an oxygen concentration of $1.0 \times 10^{-5}$ mol/L or less.

7. The process of claim 1, wherein the heating of the starting europium bromide is performed in an inert gas atmosphere or in a reducing gas atmosphere.

8. The process of claim 1, wherein the cooling of the fused europium bromide is performed under vacuum in an inert gas atmosphere or in a reducing gas atmosphere.

9. The process of claim 1, wherein the bromide source is gaseous bromide or a gaseous hydrogen bromide.

* * * * *